(12) United States Patent
Yamagishi et al.

(10) Patent No.: US 9,729,656 B2
(45) Date of Patent: Aug. 8, 2017

(54) INFORMATION PROCESSING APPARATUS, INFORMATION PROCESSING METHOD, AND STORAGE MEDIUM STORING PROGRAM

(75) Inventors: Yoshihiro Yamagishi, Tokyo (JP); Takeshi Suzuki, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 764 days.

(21) Appl. No.: 13/566,927

(22) Filed: Aug. 3, 2012

(65) Prior Publication Data

US 2013/0046860 A1    Feb. 21, 2013

(30) Foreign Application Priority Data

Aug. 19, 2011  (JP) ................. 2011-179914

(51) Int. Cl.
*G06F 15/16* (2006.01)
*H04L 29/08* (2006.01)
*H04L 29/06* (2006.01)

(52) U.S. Cl.
CPC ...... *H04L 67/2823* (2013.01); *H04L 67/2819* (2013.01); *H04L 69/28* (2013.01); *G06F 2221/2151* (2013.01)

(58) Field of Classification Search
CPC ... H04L 12/5835; H04L 51/066; H04L 67/02; H04L 67/2823; H04N 2201/3215; H04N 1/00188; H04N 1/00196; H04N 1/00464; H04N 1/00206; H04N 1/0022; H04N 1/00222; H04N 1/00954; H04N 1/32512; H04N 1/32529; H04N 2201/0093; G06F 17/30386; G06F 17/30595; G06F 3/01; G06F 11/1076; G06F 11/263; G06F 13/24; G06F 3/1206; G06F 3/1247; G06F 11/00; G06F 11/0727; G06F 11/0751; G06F 11/1068; G06F 12/023; G06F 13/385; G06F 17/2247; G06F 17/2705; G06F 17/30176; G06F 17/30185; G06F 17/30212; G06F 17/30424; G06F 17/3048; G06F 17/30483; G06F 17/30864; G06F 17/30867; G06F 17/3089; G06F 1/3287; G06F 21/34; G06F 21/36; G06F 3/04842; G06F 3/061; G06F 3/0611; G06F 3/0617; G06F 3/065;
(Continued)

(56) References Cited

U.S. PATENT DOCUMENTS 5,471,564 A * 11/1995 Dennis ................. G06F 3/1296
                                                              358/1.11
6,418,474 B1 * 7/2002 Morris ......................... 709/233
(Continued)

FOREIGN PATENT DOCUMENTS

JP    2001-195330       7/2001
JP    2001-197124 A     7/2001
(Continued)

OTHER PUBLICATIONS

Japanese Office Action dated Jul. 10, 2015 during prosecution of related Japanese application No. 2011-179914.

*Primary Examiner* — Anthony Mejia
*Assistant Examiner* — Linh T. Nguyen
(74) *Attorney, Agent, or Firm* — Fitzpatrick, Cella, Harper & Scinto

(57) ABSTRACT

A timeout time used when acquiring data is decided based on data to be acquired from a server.

22 Claims, 5 Drawing Sheets

(58) Field of Classification Search
CPC ...... G06F 3/0659; G06F 3/067; G06F 3/0676;
G06F 3/12; G06F 3/1245; G06F 3/1271;
G06F 3/1288; G06F 3/1297; G06F
9/3861; G06F 9/3865; G06F 9/44526;
G06F 9/46; G06F 9/4825; G06F 1/3228;
G06F 1/3284; G06F 2216/17; G06F
3/1211; G06F 11/0757; G06F 17/30569;
G06F 17/211
USPC ....... 709/203, 220, 224, 228, 230–231, 201,
709/217, 219; 370/338, 328; 382/232
See application file for complete search history.

(56) References Cited

U.S. PATENT DOCUMENTS

| | | | | |
|---|---|---|---|---|
| 6,477,558 | B1 * | 11/2002 | Irving | G06F 9/4887 718/100 |
| 6,578,073 | B1 * | 6/2003 | Starnes et al. | 709/219 |
| 7,016,061 | B1 * | 3/2006 | Hewitt | G06F 3/1213 358/1.13 |
| 7,203,766 | B2 | 4/2007 | Yoshiasa | |
| 7,493,394 | B2 * | 2/2009 | Zavalkovsky et al. | 709/225 |
| 7,921,208 | B2 * | 4/2011 | Hochwarth et al. | 709/225 |
| 2001/0007566 | A1 * | 7/2001 | Villatte | H04Q 3/625 370/445 |
| 2003/0016385 | A1 * | 1/2003 | Matsumoto et al. | 358/1.15 |
| 2003/0023756 | A1 * | 1/2003 | Awamoto et al. | 709/246 |
| 2003/0041095 | A1 * | 2/2003 | Konda | G06F 17/30569 709/201 |
| 2003/0065762 | A1 * | 4/2003 | Stolorz et al. | 709/223 |
| 2004/0172376 | A1 * | 9/2004 | Kobori | H04L 29/12594 |
| 2005/0232307 | A1 * | 10/2005 | Andersson et al. | 370/503 |
| 2005/0257258 | A1 * | 11/2005 | Kinoshita et al. | 726/12 |
| 2007/0023524 | A1 * | 2/2007 | Sakai et al. | 235/454 |
| 2008/0059398 | A1 * | 3/2008 | Tsutsui | G06F 17/30017 |
| 2009/0132543 | A1 * | 5/2009 | Chatley | G06F 3/0613 |
| 2009/0169021 | A1 * | 7/2009 | Ushiyama | H04L 63/0428 709/218 |
| 2010/0036943 | A1 | 2/2010 | Hosokawa | |
| 2010/0210303 | A1 * | 8/2010 | Takizuka et al. | 455/557 |
| 2011/0229106 | A1 * | 9/2011 | Cho et al. | 386/219 |
| 2011/0276768 | A1 * | 11/2011 | Koren et al. | 711/154 |
| 2012/0105909 | A1 * | 5/2012 | Kano | 386/219 |
| 2012/0269389 | A1 | 10/2012 | Nakano et al. | |

FOREIGN PATENT DOCUMENTS

| | | | | |
|---|---|---|---|---|
| JP | | 2001-282656 | 10/2001 | |
| JP | | 2006-146303 | 6/2006 | |
| JP | WO 2008112897 | A1 * | 9/2008 | ............ G06F 15/00 |
| JP | | 2009-171193 | 7/2009 | |
| JP | | 2010-41604 | 2/2010 | |
| JP | | 2012-65071 | 3/2012 | |

* cited by examiner

INFORMATION PROCESSING APPARATUS, INFORMATION PROCESSING METHOD, AND STORAGE MEDIUM STORING PROGRAM

BACKGROUND OF THE INVENTION

Field of the Invention

The present invention relates to an information processing apparatus and information processing method for deciding a timeout time used when acquiring data from a server, and a storage medium storing a program.

Description of the Related Art

There is known a system which acquires image data from an image providing server (to be referred to as a server hereinafter) present on a Web, and performs image processing such as printing or display based on the acquired image data.

In this system, when an information processing apparatus acquires data from the server, a timeout value for timeout of communication between the information processing apparatus and the server is sometimes set. If the timeout value is set as unnecessarily large, the user needs to wait for an excessively long time when a communication error occurs. If the timeout value is set as unnecessarily small, it is determined that a timeout has occurred, and communication is interrupted, though the server executes processing normally.

Japanese Patent Laid-Open No. 2001-197124 discloses a technique in which a gateway apparatus determines whether the communication partner is a cellular terminal or a terminal which communicates via a satellite, and sets different timeout values based on the determination result.

In Japanese Patent Laid-Open No. 2001-197124, the timeout value is set in accordance with a communication partner. However, when acquiring data from a server, the time until data is acquired even from the same server may change depending on processing to be executed for data in the server. For example, when acquiring data from a server by a data acquisition apparatus, the server sometimes converts the data format of data to be acquired and then transmits the data to the data acquisition apparatus. In this case, the time until the data acquisition apparatus acquires data changes depending on the presence/absence of data format conversion processing. Therefore, even when the timeout value is set in accordance with a communication partner, as described in the conventional technique, no appropriate timeout value may be set depending on processing for data.

SUMMARY OF THE INVENTION

An aspect of the present invention is to eliminate the above-mentioned problems with the conventional technology. The present invention recites an information processing apparatus and information processing method capable of appropriately deciding a communication timeout time for acquiring data from a server, and a storage medium storing a program.

The present invention in its first aspect provides an information processing apparatus comprising: a specifying unit configured to specify data which is stored in a server and is to be acquired from the server; and a decision unit configured to decide, based on the data which is specified by the specifying unit, a timeout time used when the data is acquired from the server.

The present invention in its second aspect provides an information processing method comprising: specifying data which is stored in a server and is to be acquired from the server; and deciding, based on the specified data, a timeout time used when acquiring the specified data from the server.

The present invention in its third aspect provides a computer-readable storage medium storing a program for causing a computer to execute specifying data which is stored in a server and is to be acquired from the server by an acquisition unit, and deciding, based on the specified data, a timeout time used when the acquisition unit acquires the specified data from the server.

The present invention can appropriately decide a communication timeout time for acquiring data from a server.

Further features of the present invention will become apparent from the following description of exemplary embodiments with reference to the attached drawings.

DESCRIPTION OF THE EMBODIMENTS

Figure 1:
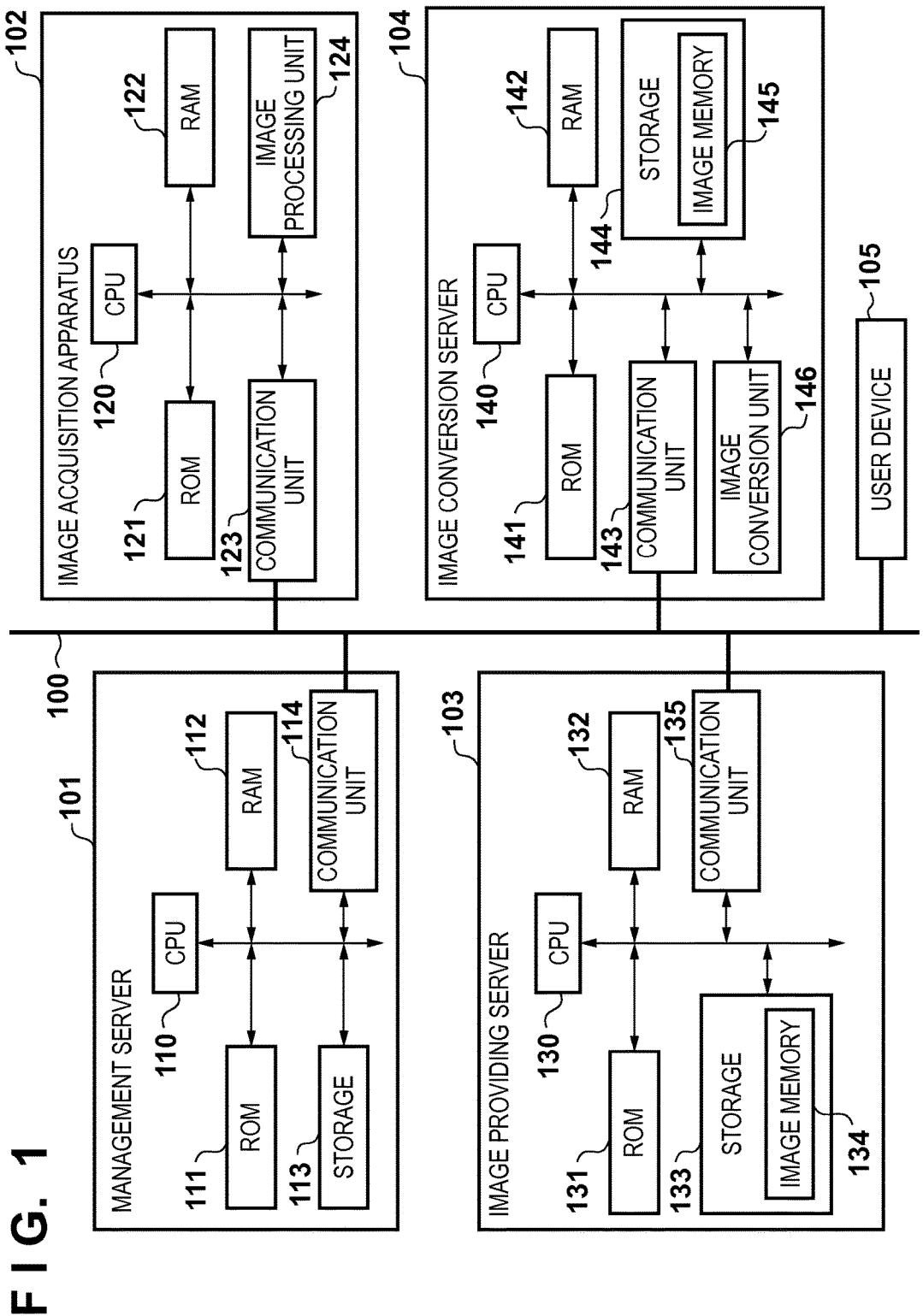
FIG. 1 is a block diagram showing the overall configuration of an information processing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

FIG. 1 is a block diagram showing the overall configuration of an information processing system in an embodiment according to the present invention. The information processing system includes a management server 101, image acquisition apparatus 102, image providing server 103, image conversion server 104, and user device 105, which can communicate with each other via a network 100.

In the system, the image providing server 103 stores image data to undergo image processing. The image acquisition apparatus 102 acquires the image data, and performs image processing such as printing or display for the acquired image data.

To acquire image data by the image acquisition apparatus 102, first, the user operates the user device 105 to select image data to undergo image processing from image data stored in the image providing server 103. Then, the user device 105 transmits, to the management server 101, an image processing job which represents the image data selected by the user and performs image processing for the image data.

Upon receiving the image processing job, the management server 101 can acquire information about the image data to undergo image processing that is designated by the image processing job, and information about the image providing server 103 or information about the image conversion server 104. In accordance with the acquired information about the server and image data, the management server 101 decides a timeout time used when the image acquisition apparatus 102 acquires the image data from the image providing server 103. Details of timeout time decision processing will be described later.

The image conversion server 104 receives image data from the image providing server 103, and converts the received image data into a format capable of image processing by the image acquisition apparatus 102. There are various data formats for saving an image in the image providing server. These data formats include formats in which the information processing apparatus cannot directly perform image processing. Hence, the conversion processing is executed. The conversion processing by the image conversion server 104 is executed in response to a request from the management server 101 or image acquisition apparatus 102. If image data designated as an image processing target by the user has a format which requires image conversion, the management server 101 requests image conversion of the image conversion server 104.

After the above processing is executed, the image acquisition apparatus 102 receives, from the management server 101, an image processing job representing image data to undergo image processing that is designated by the user, and information representing a timeout time used when acquiring the image data. The image acquisition apparatus 102 requests image data represented by the image processing job of the image providing server 103, and acquires the image data from the image providing server 103. Note that the image conversion server 104 has converted the image format of the image data.

If the image data has not been acquired yet even after the lapse of the timeout time represented by the information received from the management server 101 after the image acquisition apparatus 102 requests the image data, a communication timeout is performed. Timeout processing is performed by interrupting access to the image providing server 103 to acquire image data from the image providing server 103.

The arrangement of each apparatus shown in FIG. 1 will be explained in detail. A CPU 110 in the management server 101 controls the overall management server 101 via an internal system bus in accordance with a program read out from a ROM 111, RAM 112, or storage 113. A communication unit 114 is connected to the network 100, and performs connection to an Internet provider and data transmission/reception to/from the image acquisition apparatus 102, image providing server 103, image conversion server 104, and user device 105. Note that the management server 101 is connected to the network 100 using a well-known method.

As described above, the management server 101 decides a timeout time used when the image acquisition apparatus 102 acquires image data. In the embodiment, the timeout time is decided in accordance with image data designated as an image processing target by the user, or the state of the image providing server or image conversion server.

When deciding a timeout time in accordance with image data, the timeout time is decided in accordance with, for example, whether image data designated by the user requires image format conversion by the image conversion server 104. This is because when conversion processing is performed, the acquisition time until the image acquisition apparatus 102 acquires image data inevitably becomes longer than that when no conversion processing is performed. As the image data amount becomes larger, the acquisition time becomes longer. The timeout time is therefore decided by referring to even the data amount of image data.

When deciding a timeout time in accordance with the state of the image providing server or image conversion server, the timeout time is decided in accordance with the status of access to the server. This is because when access concentrates on the server, the acquisition time becomes long owing to generation of the processing wait time.

In this manner, the management server 101 in the embodiment decides a timeout time in accordance with the data format of image data, the type of server, the image data amount, the status of access to the server, or the like.

A CPU 120 in the image acquisition apparatus 102 controls the overall image acquisition apparatus 102 via an internal system bus in accordance with a program read out from a ROM 121 or RAM 122. A communication unit 123 holds a default timeout value considering the communication environment. When a timeout time decided by the management server 101 is designated, the communication unit 123 holds the timeout time. When acquiring image data, the CPU 120 executes a communication timeout in accordance with the timeout time.

The communication unit 123 is connected to the network 100, and performs connection to an Internet provider and data transmission/reception to/from the management server 101, image providing server 103, and image conversion server 104. Note that the image acquisition apparatus 102 is connected to the network 100 using a well-known method. An image processing unit 124 performs various image processes for acquired image data. The image processing unit 124 includes a printing unit which prints an image on a printing medium, and an image display unit which displays an image on a display.

A CPU 130 in the image providing server 103 controls the overall image providing server 103 via an internal system bus in accordance with a program read out from a ROM 131, RAM 132, or storage 133. The ROM 131 stores a control program and the like for use by the CPU 130. An image memory 134 in the storage 133 stores image data to be provided to the image acquisition apparatus 102. A communication unit 135 is connected to the network 100, and performs connection to an Internet provider and data transmission/reception to/from the management server 101, image acquisition apparatus 102, image conversion server 104, and user device 105. Note that the image providing server 103 is connected to the network 100 using a well-known method.

A CPU 140 in the image conversion server 104 controls the overall image conversion server 104 via an internal system bus in accordance with a program read out from a ROM 141, RAM 142, or storage 144. The ROM 141 stores a control program and the like for use by the CPU 140. A communication unit 143 is connected to the network 100, and performs connection to an Internet provider and data transmission/reception to/from the management server 101, image acquisition apparatus 102, image providing server 103, and user device 105. Note that the image conversion server 104 is connected to the network 100 using a well-known method. An image memory 145 in the storage 144 accumulates image data acquired from the image providing server 103, and image data after conversion processing for converting a format (for example, save format). An image conversion unit 146 converts the format of image data accumulated in the image memory 145 into a format processible by the image acquisition apparatus 102. Examples of the image data format are a file format (for example, JPEG format) which stores one image, and a file format (for example, PDF format) capable of storing a plurality of images. When the image acquisition apparatus 102 copes with the JPEG format but does not cope with the PDF format, the image conversion unit 146 converts an image file of the PDF format into an image file of the JPEG format. If the image file of the PDF format contains a plurality of images, these images are individually generated as a plurality of files of the JPEG format.

The user device 105 is an apparatus having a network function, such as a cell phone or PC. When the user operates an operation unit (not shown), the user device 105 can receive an instruction from him. Upon receiving a user instruction to perform image processing for image data stored in the image providing server 103, the user device 105 transmits, to the management server 101, an image processing job for performing image processing for the image data. The image processing job contains a URL indicating the storage location of image data selected by the user in the image providing server 103. The image acquisition apparatus 102 accesses the image providing server in accordance with the URL, and can acquire the image data selected as an image processing target by the user.

Note that the image acquisition apparatus 102 in the embodiment is, for example, a relay apparatus capable of relaying the image providing server 103 serving as a Web server and a terminal. In the relay apparatus, the API configuration sometimes changes for each Web server at an access destination. When acquiring image data, such as photo data, from each of a plurality of Web servers which provide photo sharing services, communication needs to be performed based on the API configuration of each Web server. In this case, a relay apparatus having a function of converting an API configuration is often arranged to simplify the communication configuration.

Figure 2:
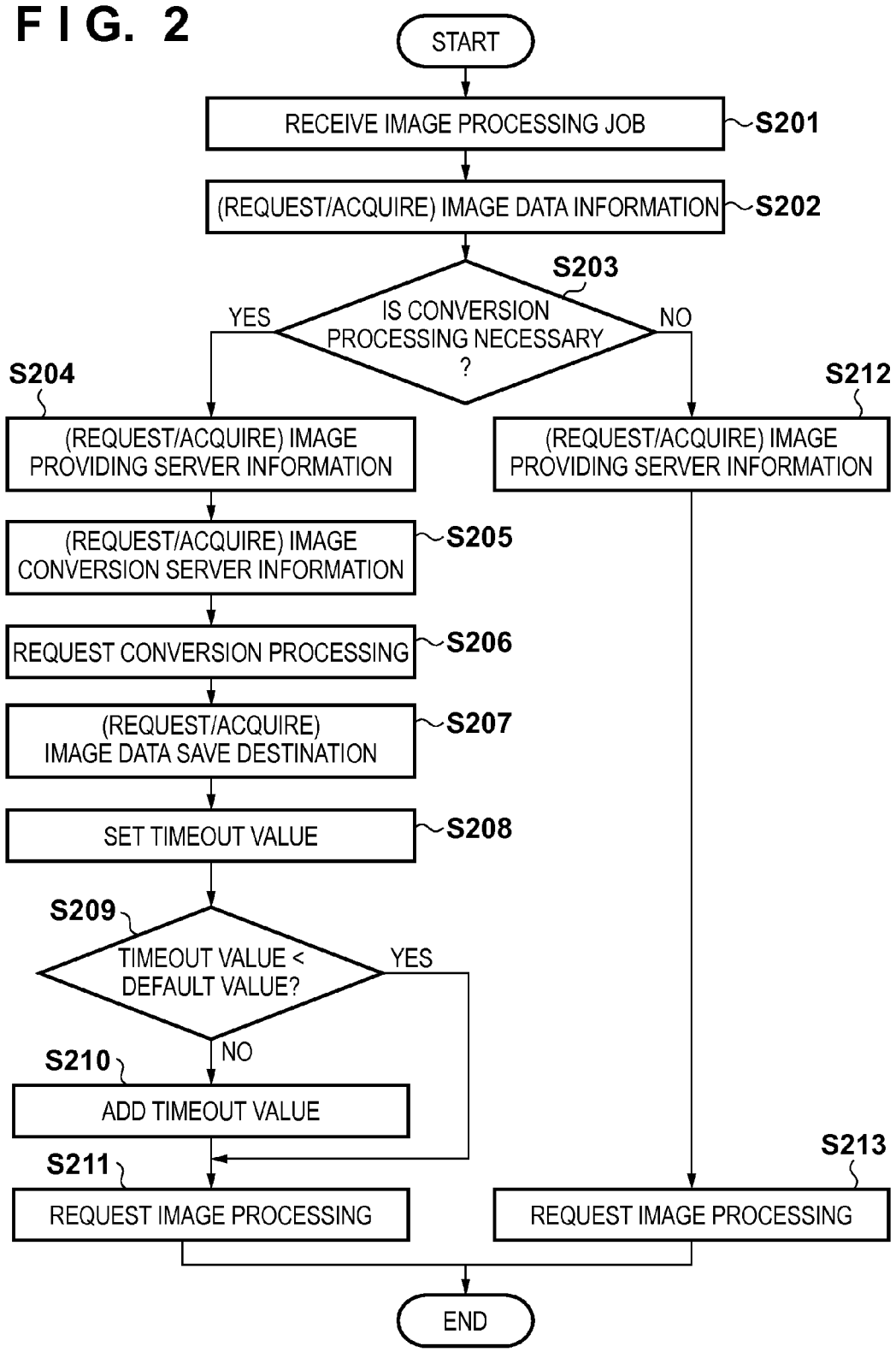
FIG. 2 is a flowchart showing a timeout value setting processing sequence in a management server.

FIG. 2 is a flowchart showing a timeout control processing sequence to be executed in the management server 101. Processing shown in FIG. 2 is executed by, for example, the CPU 110. First, in step S201, the CPU 110 receives, from the user device 105, an image processing job which designates the URL of image data to undergo image processing. Then, in step S202, the CPU 110 acquires, from the image providing server 103, image data information such as the format and data amount of image data designated by the URL in the image processing job. In this case, when an information request command is transmitted to the image providing server 103, the image providing server 103 sends back image data information in response to the request command. In step S203, the CPU 110 determines, based on the image data information acquired in step S202, whether conversion processing is necessary to convert the format of image data so that image processing can be performed for the image data.

If the CPU 110 determines that conversion processing is necessary, the process advances to step S204, and the CPU 110 acquires, from the image providing server 103, server information such as the performance and access status of the image providing server 103. In this case, when an information request command is transmitted to the image providing server 103, the image providing server 103 sends back server information in response to the request command. In step S205, the CPU 110 acquires, from the image conversion server 104, server information such as the performance and access status of the image conversion server 104. In this case, when an information request command is transmitted to the image conversion server 104, the image conversion server 104 sends back server information in response to the request command. Note that the processes in steps S204 and S205 may be executed in a reverse order. In step S206, the CPU 110 transmits, to the image conversion server 104, a conversion processing request command for the image data designated by the URL in the image processing job. In step S207, the CPU 110 acquires the save destination of the image data after conversion processing from the image conversion server 104. In this case, an information request command is transmitted to the image conversion server 104.

In step S208, the CPU 110 sets a timeout value used when the image acquisition apparatus 102 communicates with the image conversion server 104. The timeout value set in communication for acquiring image data from the image conversion server 104 by the image acquisition apparatus 102 will be explained. As the communication time until the image acquisition apparatus 102 acquires image data from the image conversion server 104, the time until image data requiring conversion processing is acquired is longer than the time until image data requiring no conversion processing is acquired. When requests from other apparatuses concentrate on the image providing server 103 and image conversion server 104, a wait time is generated until the requests are processed in each server. Even in this case, the time until the image acquisition apparatus 102 acquires image data from the image conversion server 104 tends to be long.

That is, the time until the image acquisition apparatus 102 acquires image data changes for each image processing job received from the user device 105. If a default timeout value is larger than the above time, the user needs to wait for an excessively long time when a communication error or the like occurs. If the default timeout value is smaller than the above time, it is determined that a timeout has occurred, and connection is interrupted, though communication is performed normally. Hence, when the image acquisition apparatus 102 performs communication to acquire image data, an optimum timeout value needs to be set based on information about image data, server information, and the like.

According to a timeout value setting method in the embodiment, timeout values are set in advance for a case in which image data format conversion processing is necessary and a case in which it is unnecessary. The timeout value is selected in accordance with image data to undergo image processing. However, the timeout value may be dynamically set by estimating a processing speed and processing wait time required for image data format conversion processing based on image data information acquired in step S202 and pieces of server information acquired in steps S204 and S205, and adding them. At this time, for example, it is set to increase the timeout value for a lower processing speed and longer processing wait time.

In step S209, the CPU 110 determines whether the timeout value set in step S208 is smaller than the default timeout value held in the image acquisition apparatus 102. If the CPU 110 determines that the set timeout value is equal to or larger than the default timeout value, the process advances to step S210, and the CPU 110 adds the timeout value set in step S208 to an image processing request command (image processing job) to the image acquisition apparatus 102. In step S211, the CPU 110 transmits, to the image acquisition apparatus 102, the image processing request command to which the image data save destination acquired in step S207 and the timeout value set in step S210 are added. If the CPU 110 determines in step S209 that the set timeout value is smaller than the default timeout value, priority is given to the default timeout value. This is because the default timeout value considers the communication environment. If a timeout value smaller than the default timeout value is implemented, it may be determined that a timeout has occurred, and connection may be interrupted though communication is normally performed. If, therefore, the CPU 110 determines in step S209 that the set timeout value is smaller than the default timeout value, the process advances to step S211 without adding the timeout value to the image processing request command. In the embodiment, when no timeout value is set, the image acquisition apparatus 102 uses the default timeout value to perform communication for image data acquisition.

Referring to step S203 again, if the CPU 110 determines in step S203 that image data does not require conversion processing, the process advances to step S212, and the CPU 110 acquires server information such as the performance and access status of the image providing server 103. This is the same as the processing in step S204. In step S213, the CPU 110 transmits, to the image acquisition apparatus 102, an image processing request command to which a connection destination for connection to the image providing server 103, and the save destination of image data accumulated in the image providing server 103 that is designated by the URL in the image processing job are added. In step S213, the timeout time may be decided in accordance with the server information acquired in step S212, and be added to the image processing request command.

Figure 3:
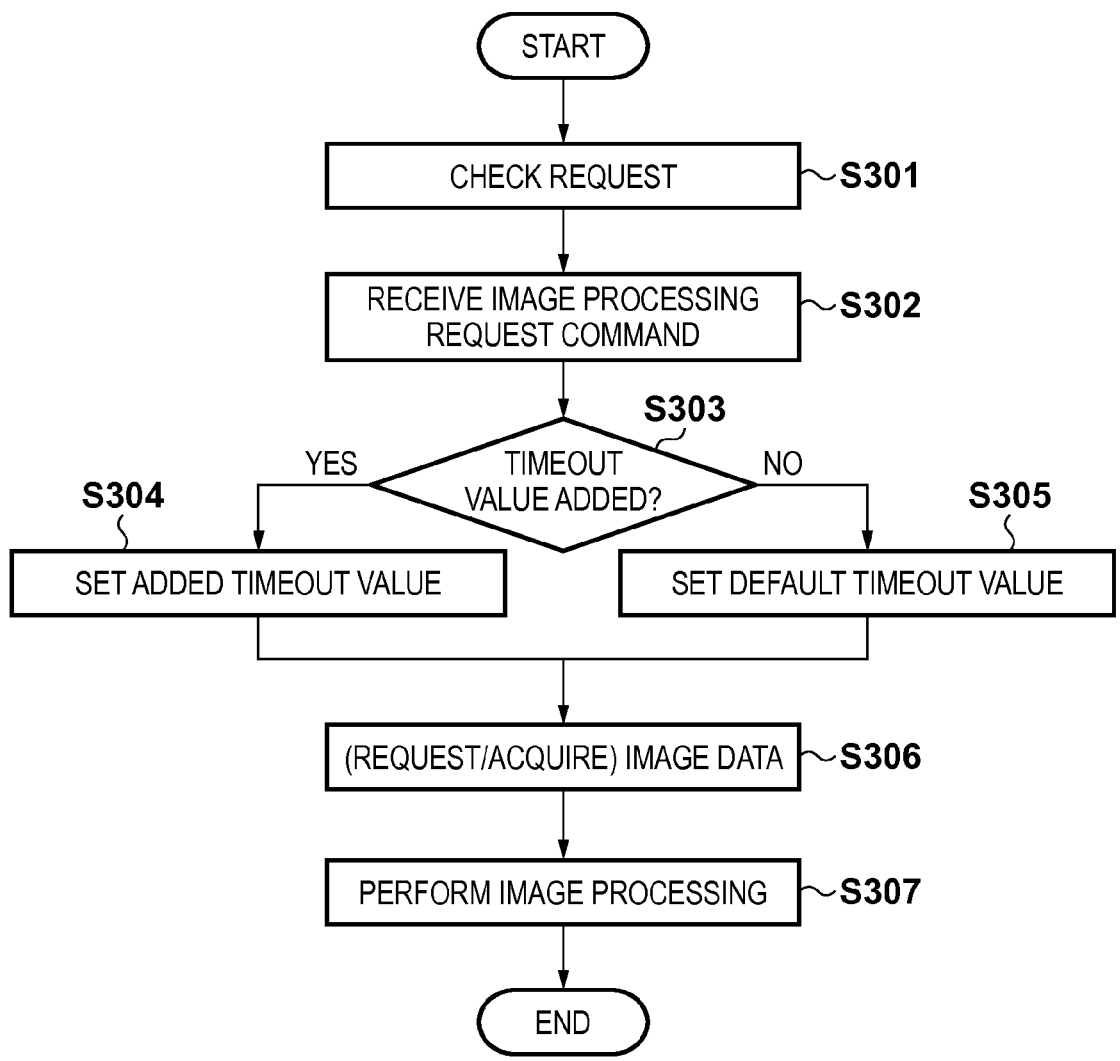
FIG. 3 is a flowchart showing a sequence up to image processing by an image acquisition apparatus.

FIG. 3 is a flowchart showing a sequence up to image processing to be executed by the image acquisition apparatus 102. Processing shown in FIG. 3 is executed by, for example, the CPU 120. First, in step S301, the CPU 120 checks the presence/absence of an image processing request command (image processing request) in the management server 101. In this case, a request check command is transmitted to the management server 101, and contents sent back from the management server 101 are confirmed. If the management server 101 has received an image processing job from the user device 105 upon receiving a request check command from the image acquisition apparatus 102, it transmits an image processing request command to the image acquisition apparatus 102.

In step S302, the CPU 120 receives the image processing request command from the management server 101. In step S303, the CPU 120 determines whether the timeout value is added to the image processing request command received in step S302. If the CPU 120 determines that the timeout value is added, the process advances to step S304, and the CPU 120 acquires the added timeout value and sets it as a timeout value in communication for acquiring image data from the image providing server 103. If the CPU 120 determines that no timeout value is added, the process advances to step S305, and the CPU 120 sets a default timeout value held in the image acquisition apparatus 102 as a timeout value in communication for acquiring image data.

In step S306, the CPU 120 acquires image data designated by the image processing job based on the set timeout value. As will be described later, the image acquisition apparatus 102 acquires image data from the image providing server 103 without performing image conversion by the image conversion server 104, or acquires image data whose image format has been converted by the image conversion server 104. In step S307, the CPU 120 performs various image processes such as printing or display for the image data acquired in step S306.

Figure 4:
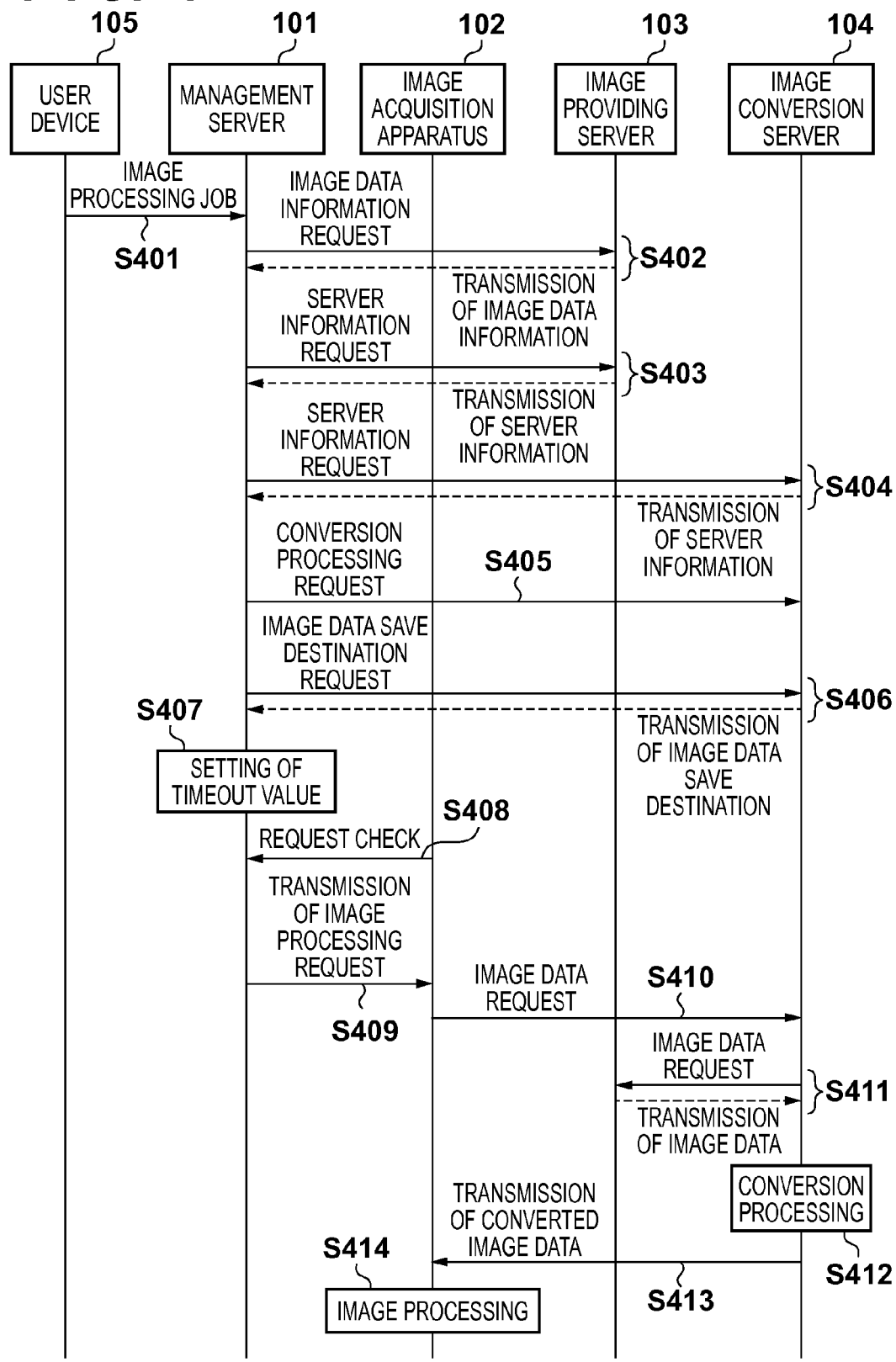
FIG. 4 is a chart showing a processing sequence between servers when conversion processing is necessary.

FIG. 4 is a chart showing a processing sequence between the servers when image data to undergo image processing requires conversion processing. Processing shown in FIG. 4 corresponds to a case in which the process advances to step S204 of FIG. 2 after the determination in step S203 and then to step S210 after the determination in step S209 in the flowchart of the management server 101 shown in FIG. 2. Also, the processing shown in FIG. 4 corresponds to a case in which the process advances to step S304 after the determination in step S303 in the flowchart of the image acquisition apparatus 102 shown in FIG. 3. That is, a case in which image data designated by the user is image data requiring image format conversion by the image conversion server 104 will be explained.

In step S401, the user device 105 transmits, to the management server 101, an image processing job in which a URL designates image data to undergo image processing. In step S402, the management server 101 requests, of the image providing server 103, image data information such as the format and data amount of the image data designated by the URL, and acquires it. Based on the acquired image data information, the management server 101 determines whether the image data to undergo image processing requires conversion processing. At this time, the management server 101 may perform this determination processing based on, for example, information of an image data format processible by the image acquisition apparatus 102 or savable in the image acquisition apparatus 102. The format information may be input by the user to the management server 101, or received by the management server 101 from the image acquisition apparatus 102.

In step S403, the management server 101 requests, of the image providing server 103, server information such as the performance and access status of the image providing server 103, and acquires it. In step S404, the management server 101 requests, of the image conversion server 104, server information such as the performance and access status of the image conversion server 104, and acquires it. Note that the processes in steps S403 and S404 may be executed in a reverse order.

In step S405, the management server 101 transmits, to the image conversion server 104, a conversion processing request command for the image data designated by the URL in the image processing job. In step S406, the management server 101 requests, of the image conversion server 104, the save destination of the image data after conversion processing, and acquires it. In step S407, the management server 101 sets a timeout value used when the image acquisition apparatus 102 communicates with the image conversion server 104 to acquire image data. This setting method is the same as that described in step S208 of FIG. 2.

In step S408, the image acquisition apparatus 102 transmits, to the management server 101, a request check command to check the presence/absence of an image processing request command in the management server 101. In step S409, the management server 101 transmits, to the image acquisition apparatus 102, an image processing request command to which the URL of the image data designated by the image processing job, information representing connection destinations for connection to the image providing server 103 and image conversion server 104, information representing the image data save destination acquired in step S406, and the timeout value set in step S407 are added. The image acquisition apparatus 102 acquires the URL, timeout value, connection destinations, and save destination from the image processing request command received in step S409. In step S410, the image acquisition apparatus 102 transmits an image data request command to the image conversion server 104. At this time, the connection destination for connection to the image providing server 103, the URL of the image data, and the image data save destination acquired in step S406 are added to the image data request command. The image acquisition apparatus 102 uses the timeout value set in step S407 as a timeout value after transmitting the image data request command, and controls communication with the image providing server 103.

In step S411, the image conversion server 104 requests image data of the image providing server 103 and acquires it in accordance with the connection destination for connection to the image providing server 103 and the URL that are added to the image request command received in step S410. In step S412, the image conversion server 104 performs conversion processing to convert the image data acquired in step S411 into a format processible by the image acquisition apparatus 102. In step S413, the image conversion server 104 transmits the image data having undergone conversion processing in step S412 to the image acquisition apparatus 102. In step S414, the image acquisition apparatus 102 performs image processing for the image data acquired in step S413. This image processing can apply various output processes such as printing control processing of causing a printing apparatus to print an image based on image data, and display control processing of causing a display apparatus to display an image. Note that the image conversion server 104 executes image data acquisition and conversion processing after receiving an image data request command in step S410, but may start them upon receiving an image conversion processing request command in step S405.

Figure 5:
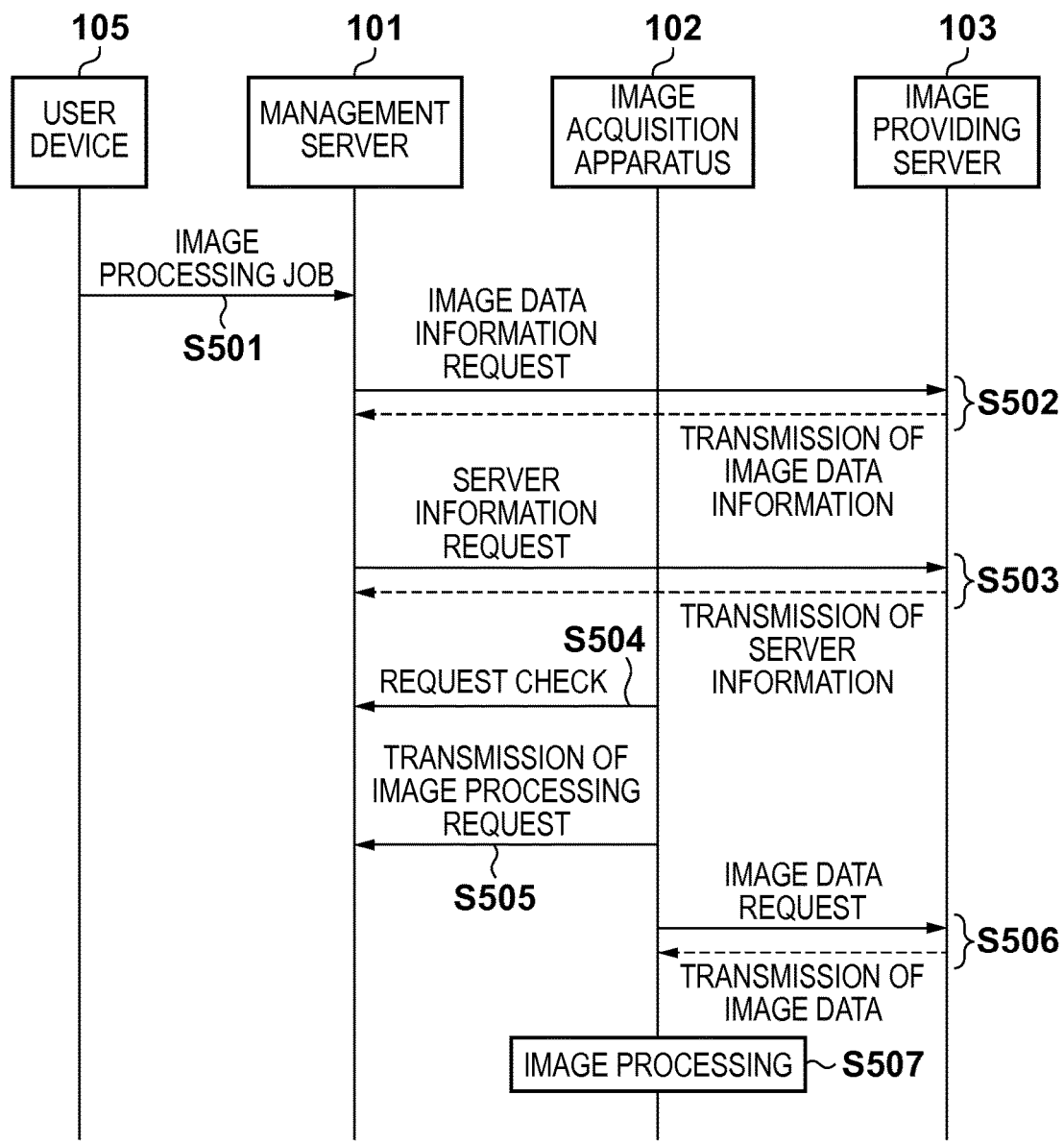
FIG. 5 is a chart showing a processing sequence between servers when no conversion processing is necessary.

FIG. 5 is a chart showing a processing sequence between the servers when image data to undergo image processing does not require conversion processing. Processing shown in FIG. 5 corresponds to a case in which the process advances to step S212 of FIG. 2 after the determination in step S203 in the flowchart of the management server 101 shown in FIG. 2. Also, the processing shown in FIG. 5 corresponds to a case in which the process advances to step S305 after the determination in step S303 in the flowchart of the image acquisition apparatus 102 shown in FIG. 3.

In step S501, the user device 105 transmits, to the management server 101, an image processing job in which a URL designates image data to undergo image processing. In step S502, the management server 101 requests, of the image providing server 103, image data information such as the save format and data amount of the image data designated by the URL, and acquires it. Based on the acquired image data information, the management server 101 determines whether the image data to undergo image processing requires conversion processing. At this time, the management server 101 may perform this determination processing based on, for example, information of an image data format processible by the image acquisition apparatus 102 or savable in the image acquisition apparatus 102. In the example shown in FIG. 5, assume that it is determined that conversion processing is unnecessary.

In step S503, the management server 101 requests, of the image providing server 103, server information such as the performance and access status of the image providing server 103, and acquires it. In step S504, the image acquisition apparatus 102 transmits, to the management server 101, a request check command to check the presence/absence of an image processing request command in the management server 101. In step S505, the management server 101 transmits, to the image acquisition apparatus 102, an image processing request command to which a connection destination for connection to the image providing server 103 and the URL designated by the image processing job are added. The image acquisition apparatus 102 acquires the connection destination and URL from the image processing request command. In step S506, the image acquisition apparatus 102 requests image data designated by the URL of the image providing server 103 serving as the acquired connection destination, and acquires it. The image acquisition apparatus 102 uses a default timeout value as a timeout value after transmitting the image data request command. In step S507, the image acquisition apparatus 102 performs various image processes such as printing and display for the acquired image data.

Even when image data does not require conversion processing, like the example shown in FIG. 5, the management server 101 may set a timeout value based on image data information and server information, add the set timeout value to an image processing request command, and transmit the image processing request command to the image acquisition apparatus 102.

The management server 101, image providing server 103, and image conversion server 104 need not always be independent of each other, and two or three servers may be configured as one server. For example, when the management server 101 and image conversion server 104 are configured as one server, the server performs conversion processing for image data acquired from the image providing server 103 by the image acquisition apparatus, and decides a timeout time between the image acquisition apparatus and the image providing server 103.

Note that the image acquisition apparatus may have the function of the management server 101. That is, the image acquisition apparatus itself determines, in accordance with image data acquired by the image acquisition apparatus, whether the image data requires image format conversion. Then, the image acquisition apparatus decides a timeout time used when acquiring the image data from the server.

The image acquisition apparatus 102 transmits an image data request command to the image conversion server 104 in FIG. 4 or the image providing server 103 in FIG. 5. However, the image acquisition apparatus 102 transmits an image data request based on a connection destination set in an image processing request command. Thus, the management server 101 can freely designate an image data acquisition destination independently of the image acquisition apparatus 102. The image acquisition apparatus 102 can therefore be configured to acquire image data from the image providing server 103 via the management server 101.

According to the embodiment, a timeout time used when acquiring image data is decided in accordance with the image data designated as an image processing target by the user. A timeout can be executed after a time suited to image data.

For example, for image data requiring image conversion processing in the image conversion server as in the embodiment, when acquiring the image data, a time longer than a default time is set as the timeout time. A timeout can therefore be executed in consideration of the time taken to perform image conversion processing.

When the data size is large, a time longer than a default time may be set as the timeout time in accordance with the data size of image data.

In the above embodiment, the timeout time can also be set in accordance with the performance and access status of the server. In this case, the management server 101 may receive server information from the server to set a timeout time in accordance with the server information, or may hold the performance of the server in advance. When the management server 101 receives an image processing job and specifies an access destination for acquiring data, it may set a timeout time in accordance with performance at the access destination.

In the above embodiment, the server stores image data, and the image acquisition apparatus 102 executes processing such as display or printing for image data acquired from the server. However, data stored in the server is not limited to image data, and may be various kinds of data such as text data. Further, processes to be performed for data by the image acquisition apparatus 102 are not limited to printing and display, and various output processes such as storage in a memory can be executed.

In the above embodiment, the format of an image to be acquired by the image acquisition apparatus is confirmed in accordance with image data information acquired from the image providing server. However, when the format of image data stored at an access destination is determined in accordance with the access destination in acquiring an image, the management server 101 may determine the contents of processing for data such as change/non-change of the image format in accordance with the access destination. In this case, the management server 101 stores information representing an image data format corresponding to each access destination. By referring to the information, the management server 101 specifies an image data format corresponding to an access destination represented by a URL contained in an image processing job received from a user device, and determines whether the image format needs to be changed.

When an image processing job received from a user device contains information representing the file extension of data to be acquired, change/non-change of the image format may be determined based on the file extension. For example, when a URL contained in an image processing job is formed from a server and folder in which data to be acquired is stored, and the file name of the data, the presence/absence of conversion processing can be determined in accordance with the file extension of the file name.

In the above embodiment, the image conversion server 104 executes processing to convert an image format, and the timeout time is decided based on the presence/absence of conversion processing. However, the image conversion server 104 may execute various image processes for an image such as image color adjustment, scaling, rotation, and trimming, and the timeout time may be decided based on the presence/absence of these processes.

When data stored in the server are not image data but various data such as text data, the server may execute processing for the data. Also in this case, the timeout time until the data is acquired is decided in accordance with the contents of processing in the server. For example, when data stored in a server (corresponding to the image providing server) is text data for displaying a Web page such as HTML data, a server (corresponding to the image conversion server) may analyze HTML data and generate an image representing the Web page. In this case, the timeout time can be decided in accordance with the contents of generation processing.

The data size of image data to undergo image processing or the pixel count of an image may be described in image data information acquired from the image providing server 103 by the management server 101 or an image processing job acquired from the user device 105. In this case, the management server 101 decides a timeout value in accordance with the data size or pixel count. That is, when the image conversion server 104 performs conversion processing for an image having a large data size or an image having a large pixel count, the conversion processing takes a longer time. Hence, when the data size is larger than a predetermined size or the pixel count is larger than a predetermined count, the timeout value set in step S208 may be further increased.

The management server 101 decides a timeout value in the embodiment, but the image acquisition apparatus 102 may decide a timeout value. In this case, for example, the management server 101 transmits image data information to the image acquisition apparatus 102. Based on the image data information, the image acquisition apparatus 102 determines whether conversion is necessary for the image. If conversion processing is necessary for the image, the timeout value is set larger than that when no conversion processing is necessary. In accordance with the timeout value, communication is performed to acquire the image from the image providing server 103.

In accordance with data requested from the management server 101, the image providing server 103 may decide a timeout value used when transmitting image data to the image acquisition apparatus 102.

In the embodiment, the presence/absence of conversion processing for data is determined in accordance with the data, and the timeout value is decided in accordance with the determination result. Also, the timeout value may be decided directly from data. For example, a memory stores a table representing a timeout value considering the presence/absence of conversion processing for data in accordance with the data type (for example, file identifier). The timeout value can be directly decided by looking up the table based on the type of data to be acquired.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-179914, filed Aug. 19, 2011, which is hereby incorporated by reference herein in its entirety.

What is claimed is:
1. A system comprising:
a data acquisition device configured to acquire data to undergo data processing;
a management server; and
a conversion server configured to convert a data format of the data which is stored in an external server,
wherein the management server receives a job request for processing of data selected by a user using an operation unit, and acquires information about a data format of the data from the external server or a predetermined device having the operation unit, wherein, based on the acquired information about the data format of the data, the management server decides timeout information which is used in a communication to be controlled by the data acquisition device, wherein, if a data format of the data stored in the external server is a first format, the management server transmits a job to which first location information indicating a location where the data is stored in the external server is added, to the data acquisition device, and does not add timeout information to the job, and the data acquisition device receives the job and determines whether or not the timeout information is added to the job, and wherein, in a case where the data acquisition device determines that the timeout information is not added to the job, the data acquisition device acquires the data from the external server based on the transmitted first location information, without the conversion server, the data acquisition device sets a predetermined time as a first timeout time used for a communication for acquisition of the data from the external server, and controls the communication for acquisition of the data from the external server using the first timeout time, and wherein, if the data format of the data stored in the external server is a second format, the management server transmits a job to which second location information indicating a location where the data to be converted by the conversion server is stored in the conversion server and the decided timeout information are added, to the data acquisition device, and the data acquisition device receives the job and determines whether or not the timeout information is added to the job, and wherein, in a case where the data acquisition device determines that the timeout information is added to the job, the data acquisition device acquires the data from the conversion server based on the transmitted second location information, the data acquisition device sets a time, specified by the added timeout information, which is longer than the predetermined time, as a second timeout time used for a communication for acquisition of the data from the conversion server, and controls the communication for acquisition of the data from the conversion server using the second timeout time, wherein the data acquisition device acquires the data from the external server in the communication in accordance with the first timeout time or from the conversion server in the communication in accordance with the second timeout time, and executes the data processing to the acquired data based on the job transmitted from the management server.

2. The system according to claim 1, wherein the first timeout time corresponds to a time after the data acquisition device requests the data to the external server, and the second timeout time corresponds to a time after the data acquisition device requests the data to the conversion server.

3. The system according to claim 1, wherein if the data format is the second format, the data acquisition device transmits the second location information to the conversion server, and then the conversion server acquires the data from the external server by accessing the external server in accordance with the second location information, and then converts the data format of the acquired data.

4. The system according to claim 1, wherein the management server further acquires server information relating to the external server from the external server and determines the time to be set as the second timeout time in accordance with the server information relating to the external server.

5. The system according to claim 4, wherein the server information includes performance and an access status of the external server.

6. The system according to claim 1, wherein the management server specifies a data size of the data, and determines the time to be set as the second timeout time based on the specified data size of the data.

7. The system according to claim 1, wherein the conversion server acquires the data from the external server and converts the data format of the data.

8. The system according to claim 7, wherein the conversion server executes the acquisition of the data from the external server, without the management server.

9. The system according to claim 1, wherein the data acquisition device is a printer, and the printer prints an image based on the acquired data.

10. The system according to claim 1, wherein the first format includes JPEG format.

11. The system according to claim 10, wherein if the data format of the data is PDF, the conversion server converts the data format to the JPEG format.

12. The system according to claim 1, further comprising, if the data format of the data stored in the external server is the second format, the management server determines whether or not the decided timeout information is less than the predetermined time, in a case where the management server determines that the decided timeout information is less than the predetermined time, the management server transmits a job to which second location information indicating a location where the data to be converted by the conversion server is stored in the conversion server is added, to the data acquisition device, and does not add the decided timeout information to the job, and the data acquisition device receives the job and determines whether or not the timeout information is added to the job, in a case where the data acquisition device determines that the timeout information is not added to the job, the data acquisition device requests acquisition of the data from the conversion server based on the transmitted second location information, the data acquisition device sets the predetermined time as the second timeout time used for a communication for acquisition of the data from the conversion server, and controls the communication for acquisition of the data from the conversion server using the second timeout time.

13. The system according to claim 12, wherein the predetermined time is predetermined based on an environment of a network among the data acquisition device, the conversion server, and the external server.

14. The system according to claim 1, wherein the management server decides the timeout information based on need of a process performed by the conversion server.

15. A method according to claim 12, further comprising, if the data format of the data stored in the external server is the second format, the management server determines whether or not the decided timeout information is less than the predetermined time, in a case where the management server determines that the decided timeout information is less than the predetermined time, the management server transmits a job to which second location information indicating a location where the data to be converted by the conversion server is stored in the conversion server is added, to the data acquisition device, and does not add the decided timeout information to the job, and the data acquisition device receives the job and determines whether or not the timeout information is added to the job, in a case where the data acquisition device determines that the timeout information is not added to the job, the data acquisition device requests acquisition of the data from the conversion server based on the transmitted second location information, the data acquisition device sets the predetermined time as the second timeout time used for a communication for acquisition of the data from the conversion server, and controls the communication for acquisition of the data from the conversion server using the second timeout time.

16. A method according to claim 13, wherein the predetermined time is predetermined based on an environment of a network among the data acquisition device, the conversion server, and the external server.

17. A method according to claim 14, wherein the management server decides the timeout information based on need of a process performed by the conversion server.

18. A method executed in a system comprising a data acquisition device configured to acquire data to undergo data processing, an external server that stores the data, a management server, and a conversion server configured to convert a data format of the data stored in the external server, the method comprising:

the management server receiving a job request for processing of data selected by a user using an operation unit;

the management server acquiring, from the external server or a predetermined device having the operation unit, information about a data format of the data;

the management server deciding timeout information which is used in a communication to be controlled by the data acquisition device, based on the acquired information about the data format of the data;

if a data format of the data stored in the external server is a first format, transmitting, by the management server, a job to which first location information indicating a location where the data is stored in the external server is added, to the data acquisition device, and not adding, by the management server, timeout information for specifying a timeout time, to the job, and the data acquisition device receiving the job and determining whether or not the timeout information is added to the job, wherein, in a case where the data acquisition device determines that the timeout information is not added to the job, the data acquisition device acquires the data from the external server based on the transmitted first location information, without the conversion server, the data acquisition device sets a predetermined time as a first timeout time used for a communication for acquisition of the data from the external server, and controls the communication for acquisition of the data from the external server using the first timeout time;

if the data format of the data stored in the external server is a second format, the management server transmitting a job to which second location information indicating a location where the data to be converted by the conversion server is stored in the conversion server, and the decided timeout information are added, to the data acquisition device, and the data acquisition device receiving the job and determining whether or not the timeout information is added to the job, wherein, in a case where the data acquisition device determines that the timeout information is added to the job, the data acquisition device acquires the data from the conversion server based on the transmitted second location information, the data acquisition device sets a time, specified by the added timeout information, which is longer than the predetermined time, as a second timeout time used for a communication for acquisition of the data from the conversion server, and controls the communication for acquisition of the data from the conversion server using the second timeout time, and wherein the data acquisition device acquires the data from the external server in the communication in accordance with the first timeout time or from the conversion server in the communication in accordance with the second timeout time, and executes the data processing to the acquired data based on the job transmitted from the management server.

19. A non-transitory computer-readable storage medium storing a program for causing a computer system to execute a method in a system comprising a data acquisition device configured to acquire data to undergo data processing, an external server that stores the data, a management server, and a conversion server configured to convert a data format of the data stored in the external server, the program comprising code to execute:

the management server receiving a job request for processing of data selected by a user using an operation unit;

the management server acquiring, from the external server or a predetermined device having the operation unit, information about a data format of the data;

the management server deciding timeout information which is used in a communication to be controlled by the data acquisition device, based on the acquired information about the data format of the data;

if a data format of the data stored in the external server is a first format, transmitting, by the management server, a job to which first location information indicating a location where the data is stored in the external server is added, to the data acquisition device, and not adding, by the management server, timeout information for specifying a timeout time, to the job, and the data acquisition device receiving the job and determining whether or not the timeout information is added to the job, wherein, in a case where the data acquisition device determines that the timeout information is not added to the job, the data acquisition device acquires the data from the external server based on the transmitted first location information, without the conversion server, data acquisition device sets a predetermined time as a first timeout time used for a communication for acquisition of the data from the external server, and controls the communication for acquisition of the data from the external server using the first timeout time;

if the data format of the data stored in the external server is a second format, the management server transmitting a job to which second location information indicating a location where the data to be converted by the conversion server is stored in the conversion server, and the decided timeout information are added, to the data acquisition device, and data acquisition device receiving the job and determining whether or not the timeout information is added to the job, wherein, in a case where the data acquisition device determines that the timeout information is added to the job, the data acquisition device acquires the data from the conversion server based on the transmitted second location information, the data acquisition device sets a time, specified by the added timeout information, which is longer than the predetermined time, as a second timeout time used for a communication for acquisition of the data from the conversion server, and controls the communication for acquisition of the data from the conversion server using the second timeout time, and wherein the data acquisition device acquires the data from the external server in the communication in accordance with the first timeout time or from the conversion server in the communication in accordance with the second timeout time, and executes the data processing to the acquired data based on the job transmitted from the management server.

20. A non-transitory computer-readable storage medium according to claim 12, further comprising, if the data format of the data stored in the external server is the second format, the management server determines whether or not the decided timeout information is less than the predetermined time, in a case where the management server determines that the decided timeout information is less than the predetermined time, the management server transmits a job to which second location information indicating a location where the data to be converted by the conversion server is stored in the conversion server is added, to the data acquisition device, and does not add the decided timeout information to the job, and the data acquisition device receives the job and determines whether or not the timeout information is added to the job, in a case where the data acquisition device determines that the timeout information is not added to the job, the data acquisition device requests acquisition of the data from the conversion server based on the transmitted second location information, the data acquisition device sets the predetermined time as the second timeout time used for a communication for acquisition of the data from the conversion server, and controls the communication for acquisition of the data from the conversion server using the second timeout time.

21. A non-transitory computer-readable storage medium according to claim 13, wherein the predetermined time is predetermined based on an environment of a network among the data acquisition device, the conversion server, and the external server.

22. A non-transitory computer-readable storage medium according to claim 14, wherein the management server decides the timeout information based on need of a process performed by the conversion server.

* * * * *